United States Patent [19]

Yamazoe et al.

[11] Patent Number: 4,526,042
[45] Date of Patent: Jul. 2, 1985

[54] AIR FLOW MEASURING APPARATUS

[75] Inventors: Hisamitsu Yamazoe; Hideki Matsuura, both of Kariya; Katsunori Ito, Aichi; Masahiro Ohba, Okazaki, all of Japan

[73] Assignee: Nippondenso Co., Ltd., Kariya, Japan

[21] Appl. No.: 466,143

[22] Filed: Feb. 14, 1983

[30] Foreign Application Priority Data

Feb. 17, 1982 [JP] Japan ................................ 57-23889

[51] Int. Cl.³ ............................................. G01F 1/28
[52] U.S. Cl. ................................ 75/861.75; 73/118 B
[58] Field of Search ............ 73/118 A, 861.75, 861.76; 123/494; 340/686

[56] References Cited

U.S. PATENT DOCUMENTS

| | | | |
|---|---|---|---|
| 3,500,389 | 3/1970 | Robinson | 340/686 X |
| 3,837,321 | 9/1974 | Sauer | 123/494 |
| 3,880,125 | 4/1975 | Kammerer et al. | 123/494 |
| 3,934,561 | 1/1976 | Romann et al. | 123/494 |
| 4,149,494 | 4/1979 | Wolfinger et al. | 123/494 |
| 4,366,705 | 1/1983 | Fuji et al. | 73/118 A |

FOREIGN PATENT DOCUMENTS 2242819  8/1972  Fed. Rep. of Germany ...... 123/494

*Primary Examiner*—Charles A. Ruehl
*Attorney, Agent, or Firm*—Cushman, Darby & Cushman

[57] ABSTRACT

An air flow measuring apparatus having a measuring plate provided within an air intake pipe and a potentiometer having divided resistor material, a slider support member and switching contacts in which the shaft of the measuring plate and the shaft of the slider support member of the potentiometer interlock with each other, and corresponding electrical signals are produced from the potentiometer in accordance with the pivotal movement of the measuring plate, which pivotal movement is proportional to the intake air flow. With this construction, highly accurate measurement of the intake air flow is possible even with low manufacturing cost for the apparatus.

8 Claims, 6 Drawing Figures

AIR FLOW MEASURING APPARATUS

BACKGROUND OF THE INVENTION

1. Field of the Invention

The present invention relates to an air flow measuring apparatus for measuring air flow sucked from an air intake pipe by converting it into electrical signals so as to electronically control a fuel injection unit for an internal combustion engine.

2. Description of the Prior Art

A measuring plate type air flow measuring apparatus is widely known in which an intake air flow is measured by converting it into electrical signals, e.g. a voltage output by a potentiometer arranged in the intake pipe of the internal combustion engine, which potentiometer interlocks with a measuring plate which is pivotally displaced in accordance with the intake air flow.

However, such an air flow measuring apparatus as described above was developed as an analogue control type electronic fuel injection control device and has the following problems when used for an electronic fuel injection control unit of a digital control type in which highly accurate control is possible by using a microprocessor (which has rapidly come into wide use).

Namely, in the electronic fuel injection control unit of the digital control type, an air flow measuring range (the ratio between the minimum air flow and the maximum air flow) necessary for an intake air flow measuring apparatus is generally about 1:40 and measuring errors of air flow must be maintained less than ±2% regardless of any air flow zone in view of the power of the internal combustion engine. Purification is also measured with respect to exhaust gases. For these reasons, the measuring accuracy must be maintained within: $1/40 \times 2/100 = 1/2000 \approx 1/2048 = \frac{1}{2}''$, so that the voltage output of the air flow thus measured in the digital control type electronic fuel injection control apparatus is converted into digital signals by an analog/digital converter (A/D converter) with more than 11 bits.

However, mass production elements commercially available such as microprocessors and A/D converters are all 8-bit systems. Accordingly, if these 8-bit systems can be used as electronic fuel injection control systems (ECU), not only can the systems be extremely simplified in hardware and software aspects, but also the operating efficiency necessary for air flow measuring operation in the central processing unit (CPU) for the microprocessor can be bettered when processing equal volumes of data.

Furthermore, they also enable the ignition period of an ignitor as a subsystem to be controlled, thus enabling the cost of the electronic injection control apparatus to be lowered.

However, as described in the foregoing, as a more than 11-bit A/D converter is required in the conventional air flow measuring apparatus, there were drawbacks preventing simplification of the systems as well as preventing large scale cost-reductions.

Moreover, improvement in fuel consumption for especially motor vehicles has been socially demanded. As one of the effective means for realizing this, there is an idle speed control method (ISC) which tries to restrict the engine speed so that minimum air flow will become small.

On the other hand, there is a tendency that the maximum air flow increases by using a double overhead cam mechanism, (DOHC) or by performing surcharging through a turbo-charger. As a result, a wide dynamic range such as 1:70 to 1:80 in the measuring range of a vacant air flow measuring apparatus has been demanded, and this in turn necessitates an A/D converter with large bit numbers in order to accurately measure the air flow by the prior art air flow measuring apparatus, thus making the cost of ECU to be more and more high.

SUMMARY OF THE INVENTION

It is therefore a main object of the present invention to provide an air flow measuring apparatus using a low cost A/D converter which facilitates processing and which is capable of securing a sufficient measuring accuracy necessary for control by dividing potentiometer resistors of a measuring plate type air flow measuring apparatus into more than two portions so as to be arranged successively, and by enabling the divided resistor portions corresponding to the intake air flow to be determined or discriminated.

It is another object of the present invention to provide an air flow measuring apparatus in which air flow sucked from an intake pipe can be measured by the output voltage of a divided resistor material of a potentiometer, which corresponds to the intake air flow.

It is still another object of the present invention to provide an air flow measuring apparatus in which a low cost A/D converter can be used and sufficient measurement accuracy for fuel injection control can be obtained.

It is another object of the present invention to provide an air flow measuring apparatus in which resistors and resistor material of the potentiometer are arranged in such a manner that the output voltage is divided into plural portions or zones, and the contacts of the potentiometer produce electrical signals in binary form in response to each divided resistor portion so as to accurately measure the intake air flow.

It is still another object of the present invention to provide an air flow measuring apparatus in which the dynamic range of the intake air flow can be large while the manufacturing cost can be largely reduced.

According to the present invention, an air flow measuring apparatus has a measuring plate or bar arranged at the intake pipe of an internal combustion engine. The measuring plate pivotally displaced in accordance with intake air flow. A potentiometer which interlocks with the measuring plate converts the intake air flow into electric signals. A resistor material of the potentiometer is divided into at least two portions with a plurality of contacts provided corresponding to the divided resistor portions, respectively, for producing electrical signals in binary form. The divided resistor portions are discriminated by the electrical signals from the contacts with the divided resistor portions corresponding to the intake air flow, thereby measuring the intake air flow.

These and other objects and advantages of the present invention will be better understood by the following description with reference to the accompanying drawings.

DESCRIPTION OF PREFERRED EMBODIMENT

Figure 1:
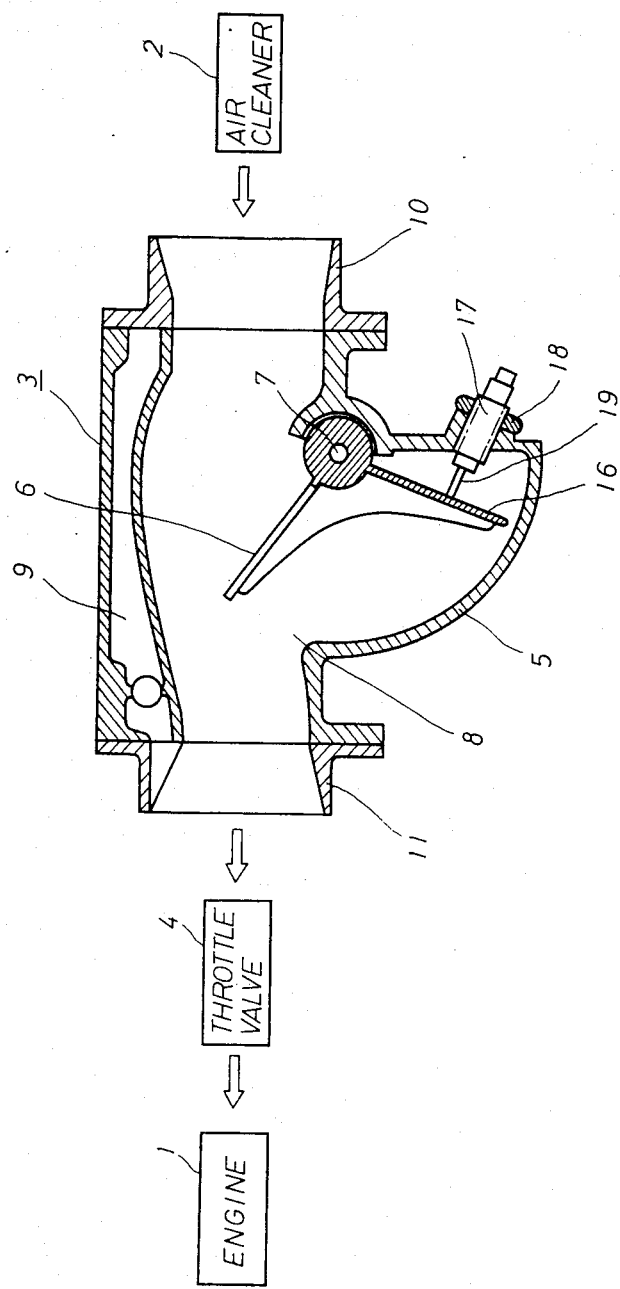
FIG. 1 illustrates a cross-sectional view of an air flow measuring apparatus according to the present invention.
Figure 2:
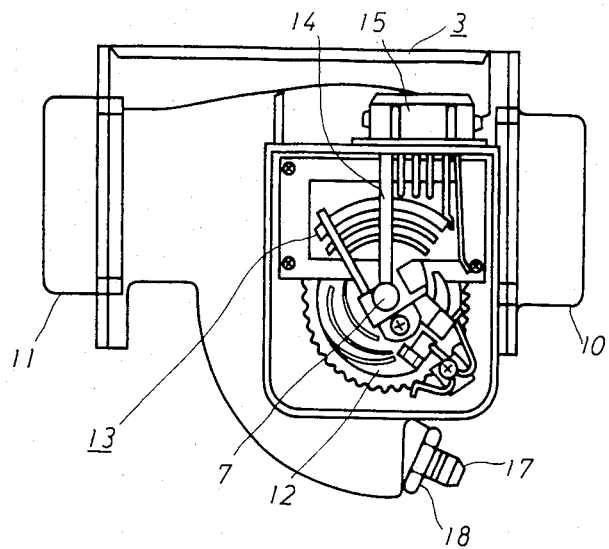
FIG. 2 illustrates the air flow measuring apparatus having a potentiometer portion as one embodiment according to the present invention.
Figure 3:
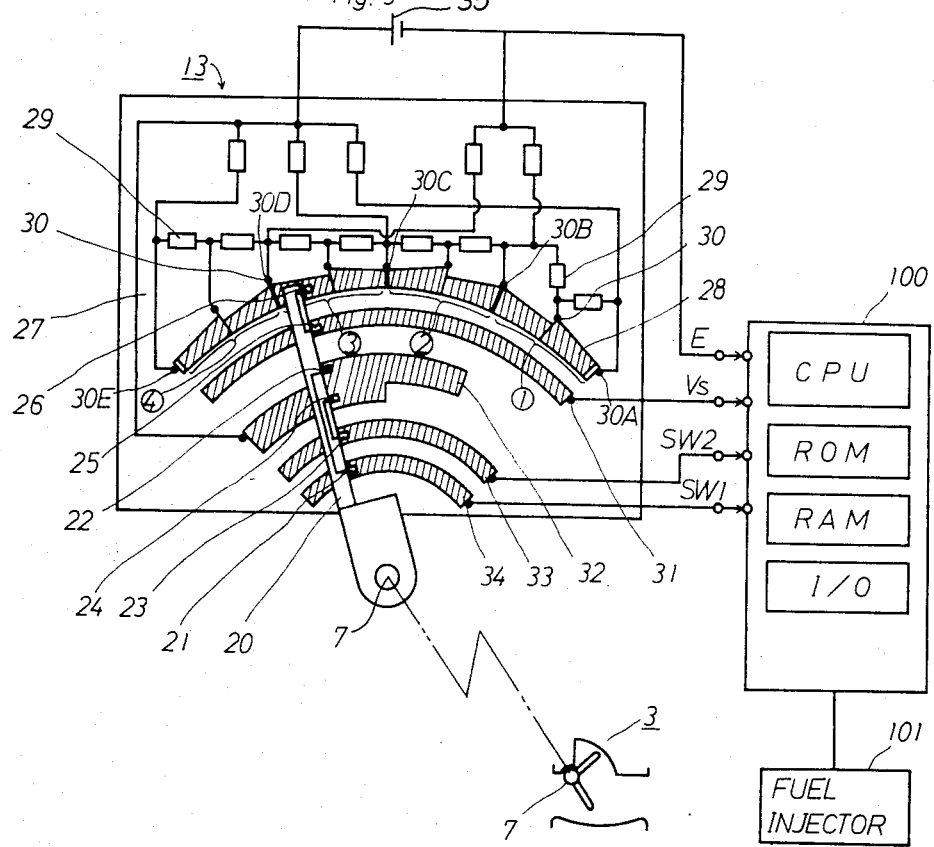
FIG. 3 illustrates a detailed electrical circuit construction of the potentiometer portion shown in FIG. 2, according to the present invention.

Referring to FIGS. 1-3, the air flow measuring apparatus according to the present invention is shown together with a spark ignition engine which is provided with a known electronically controlled fuel injection device, an air cleaner 2, and a throttle valve 4. The air is sucked into the engine 1 through throttle valve 4, while the fuel is also supplied through fuel injectors 101 in FIG. 3.

An air flow measuring apparatus 3 has a housing 5 which is formed of an aluminum die casting. A measuring plate 6 also formed of aluminum die casting is provided within the housing 5.

The measuring plate 6 is constructed in such a manner that it is pivotally displacable or rotatable around a shaft 7 to which the circular cross section of the measuring plate 6 is secured.

Within the housing 5, there are provided a main air path 8 in which sucked air flows from air cleaner 2 to throttle valve 4, and an auxiliary air path 9 which bypasses the air path 8 and measuring plate 6 so as to set the initial air flow. Within the housing 5, there are also provided an inlet duct 10, for the introduction of the intake air, and an outlet duct 11. As shown in FIG. 2, the shaft 7 is provided with a restoring spring 12 so that a torque is imparted to the measuring plate 6 by the restoring spring 12 in the clockwise direction. Each rotational amount or rotational angle of the measuring plate 6 is converted into electrical signals by a potentiometer 13 which interlocks with the shaft 7, and the electrical signals thus converted are inputted to an electronic control unit 100 for controlling the fuel injection amount through a terminal 14 and a connector 15.

Moreover, the measuring plate 6 is provided with an attenuation plate 16 for reducing the vibration of the measuring plate 6. An auxiliary spring means 17 is threaded with the housing 5 so as to contact a rod member 19 (see Fig. 1) to the attenuation plate 16 from the rear thereof and it is secured or fixed by a nut 18.

The position of starting the contact between the rod member 19 of auxiliary spring means 17 and the attenuation plate 16 is set at an upper limit such that the measurement errors of the air flow due to intake air pressure vibration can be held within an allowable range.

When operating the engine 1, air for combustion flows from the inlet duct 10 of the air flow measuring apparatus 3 to the outlet duct 11 of the apparatus 3. Torque, which is dependent upon the pressure difference between the up stream sides and down stream of the measuring plate 6 and which changes in accordance with the intake air flow, is exerted on the measuring plate 6. As a result, the measuring plate 6 pivotally rotates (i.e. angularly displaces) to the position where the torque thus produced and the torque imparted by the restoring spring 12 balance each other.

The rotational amount of the measuring plate 6 is dependent on the intake air flow, and the rotational amount representative of the intake air flow is converted into electrical signals through the potentiometer. These signals are used as signals for determining the fuel injection amount.

FIG. 3 shows a detailed electrical circuit arrangement of the potentiometer 13 in which the conversion of the rotational amount into electrical signals can be carried out by dividing the resistors of the potentiometer into four portions, for example, designated by ①-④ in the figure.

A slider supporting member 20 is made of an electrically insulated material such as synthetic resin and it is fixed to the shaft 7 so as to move together (i.e. to interlock) with the shaft 7. The slider supporting member 20 is provided with a plurality of contacts 21 through 26 with each contact being selectively electrically insulated from each other, as shown in FIG. 3.

Each contact of the contacts 21 through 26 is in the form of a microbrush and is made of a precious metal alloy such as silver, palladium, etc. The contact 21 and contact 22, the contact 23 and the contact 24, and the contact 25 and the contact 26 of the brush shaped multicontacts are connected by wires to each other in pairs as potential pick-up contacts, as shown in FIG. 3.

On an insulating base plate 27 there is provided a resistor material 28 printed thereon. This material has a plurality of terminals 30, the number of which is larger than the number of the potential division to be adjusted by each potential adjusting resistor 29, while each portion of divided resistor material 28 has a higher resistance value than each potential or voltage adjusting resistor 29. D.C. power source 35 of FIG. 3 supplies voltage to this plurality of resistors.

By sliding the contact 26 of the slider supporting member 20 on the resistor material 28, the potential (i.e., voltage) division between adjacent terminals 30 is carried out, and each output voltage corresponding to the rotation angle of the measuring plate 6 is produced in the form of, for example, an exponential function.

The output voltage is picked up from a sliding (conductive) surface 31 with the upper surface thereof comprising a resistor material 28, and also with a conductive electrode material being printed on the insulating base plate 27 on the rear surface of surface 31.

The sliding (conducting) portions 32 through 34 comprise switches SW1 and SW2 for producing a voltage corresponding to the divided positions of the resistor 28. Each switching point is respectively formed for each switch at the same rotational position of the shaft as that of its respective terminal 30, and is voltage adjusted for identification. Each sliding portion (32-34) is formed in such a manner that the upper surface thereof is made of a resistor material while the rear surface thereof is made of a conductive electrode material, as in the case of the sliding surface 31. The number of the switches is determined by the number of divided resistor materials 28, and at least two switches are required to represent rotational potentiometer positions because the output voltage is divided into four portions by the divided resistor material 28.

The terminals of the two contacts 33 and 34 of the two switches SW1 and SW2 and the contact 25 (through surface 31) are connected respectively to each input of a 8 bit-microprocessor 100 which comprises a read only memory (ROM) for storing control programs and data, a random access memory (RAM) for storing various data supplied from the inputs from the microprocessor 100 or from the ROM, and an input/output device (I/O). The input/output device (I/O) contains an 8-bit A/D converter. The output of the microprossor 100 is connected so as to control fuel injector 101.

The microprocessor 100 controls the fuel injector 101 in accordance with the conditions of the output signals from the contacts 31, 33 and 34, as well as various data and programs stored in the RAM and ROM as is well known, the detail description of which will be omitted here as they are not directly related to the present invention and as they are all well known techniques.

Figure 4:
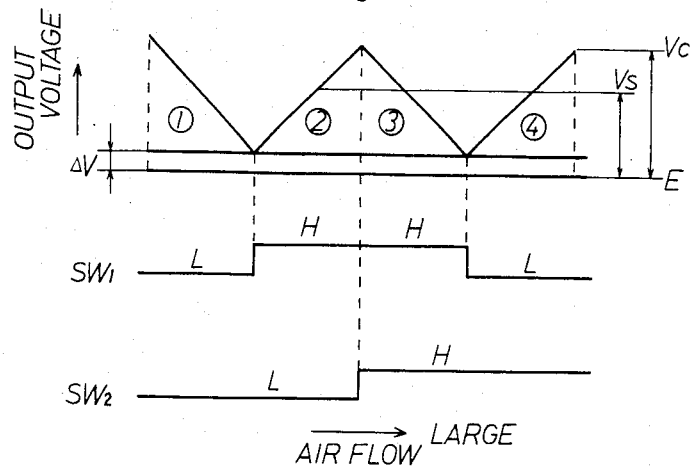
FIG. 4 illustrates one timing chart of an output voltage and switching functions of the switches in one condition.

The operation of the potentiometer circuit of the air flow measuring apparatus will now be described with reference to FIG. 4, firstly. In this embodiment, potential Vc is supplied to terminals 30A, 30C and 30E, and potential $\Delta V$ is supplied to terminals 30B and 30D. In this case, the potential adjusting resistor controls the voltage of D.C. power source, and divides the voltage into individual resistors. The electric potential at each terminal is as below: $V_A > V_B$, $V_B < V_C$, $V_C > V_D$, $V_D < V_E$. The resistor 28 is divided into the four portions ①, ②, ③ and ④ as the slider supporting member 20 moves from the right side to the left hand side in the Figure due to the increase in the amount of air flow. As shaft 7 is increasingly rotated by increasing air flow, in ①, the value of the output voltage Vs gradually reduces from a high (or large) value to a low (or small) value, while in portion ②, the value of the output voltage Vs gradually increases from a small value to a large value. It is also constructed so that in portion ③, the value of the output voltage Vs gradually decreases from a high value to a low value, while in portion ④ the value gradually increases from a small value to a large value. As a result, the output voltage changes as shown in FIG. 4. (The real voltage change is showed in a curved line, if the resistor 28 is constituted as shown in FIG. 3.)

On the other hand, as FIG. 3 indicates, the conductive surface 32 is formed into a unique shape so that the conductive surface matches each terminal of resistor 28, and the two switches SW1 and SW2 function such that in portion ① of the resistor material, the switch SW1 is turned ON (the voltage level is low, i.e.L) and switch SW2 is turned ON (the voltage level is low) In portion ②, the switch SW1 is turned OFF (the voltage level is high, i.e. H) and the switch SW2 is turned ON (voltage level L). Similarly, in portion ③, the switch SW1 and the switch SW2 are both turned OFF (H level). While in portion ④, the switch SW1 is turned ON (L level) and the switch SW2 is turned OFF (H level).

Accordingly, the combination of digital signals consisting of H level and L level of the switches SW1 and SW2 enables discrimination of which of the divided resistor portions 1-4 of the resistor material 28 is used (i.e. presently contacted).

Accordingly, using an A/D converter of low cost and small output bit number, the air flow can be measured by the A/D conversion of the output voltage between the levels Vs and E thereof, which is produced by the divided resistor portions. Thus the air flow can be measured in a divided state of four blocks.

Moreover, in the arrangement of the divided resistor portions ①-④ according to the embodiment of the present invention, it is to be noted that each output voltage value Vs of the divided resistor portions is arranged in such manner that the output voltage Vs in the divided resistor portion ① gradually decreases from high to low value (or large to small value), the output voltage Vs in the portion ② gradually increases from low to high (small to large value), the output voltage Vs in the portion ③ gradually decreases from high to low, and the output voltage Vs in the portion ④ gradually increases from low to high. That is, each resistance value is alternately changed in its conditions as the air flow increases.

With this arrangement, even when the contact 26 moves to the adjacent divided resistor portion from one divided resistor portion as a result of the air flow being more or less increased or decreased, the terminals 30A, 30C and 30E are in equal potential and the terminals 30B and 30D are in equal potential, and the digital value of the output voltage after A/D conversion does not change. Thus, the measuring errors in the air flow can be kept small.

In the embodiment according to the present invention, with respect to discrimination signals or distinguishing signals of the divided resistor portions by the switches SW1 and SW2, the point of switching the H (high) level and L (low) level of each switch SW1 and SW2 is constructed in such a manner that only one switching is performed at any switching point, so that possible reading errors can be prevented at the switching points.

Moreover, in the embodiment according to the present invention it is desirable to select each switching point at $\Delta V$ level which is slightly larger than the minimum voltage value E (as shown in FIG. 4) so that the converted digital value of the output voltage across each divided resistor portion may not lower than 40 digits ($\pm 2.5\%$) thereby reducing the effect of the bit errors.

Figure 5:
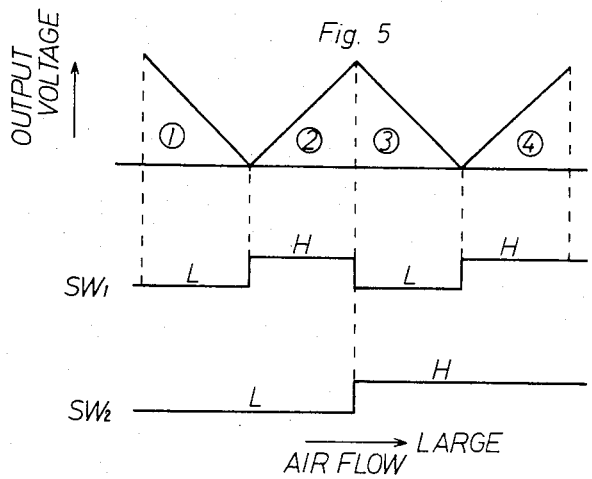
FIG. 5 illustrates another timing chart of an output voltage and switching functions of the switches in another condition.

FIG. 5 shows another timing chart of the output voltage and the switching functions of the two switches in a second condition. In this condition, in portion or zone ① of the output voltage, the switching point of the switch SW1 is L level. That is, the resistance value of the resistor 28 gradually decreases from high to low value in zone ②, and the switching point of the switch SW1 is H level. Similarly, in zone ③ the switching point of the switch SW1 is L level and in zone ④ of the output voltage the switching point of the switch SW1 is H level. Namely, the switching is performed alternately (e.g., L→H→L→H level) by the switch SW1, while the switching condition of the switch SW2 is the same as that shown in FIG. 4.

Figure 6:
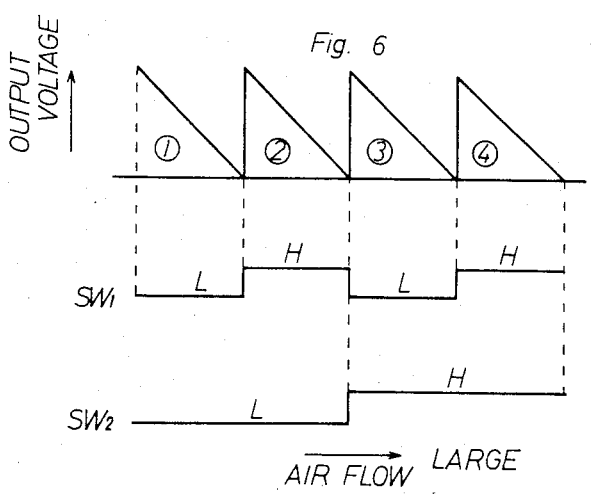
FIG. 6 illustrates still another timing chart of an output voltage and switching functions of the switches in a third condition.

In FIG. 6, the timing chart of a third condition between the output voltage and the switching conditions of the switches SW1 and SW2 is shown. In this case, the switching conditions performed by the two switches SW1 and SW2 are the same as those shown in FIG. 5. However, in this embodiment, the output voltage of zones ①-④ corresponding to each divided resistor portion ①-④ gradually decreases from high to low value respectively.

Although the construction of the third embodiment shown in FIG. 6 is almost the same as that of the first or second embodiment shown in FIG. 4 or FIG. 5, the first embodiment shown in FIG. 4 will be preferable in view of the incidence of few output errors at the switching points in the output voltage by the potentiometer and switches SW1 and SW2.

As described in the foregoing, the present invention resides in the air flow measuring apparatus in which the resistor material of the potentiometer is arranged in such a manner that it is divided into at least two portions, with contacts for producing electrical signals in binary form in response to each divided resistor portion. The divided resistor portions corresponding respectively to the intake air flow is distinguished by signals from the contacts so as to measure the intake air flow, whereby the measuring range, i.e. the dynamic range of the intake air flow, can be large while an 8-bit microprocessor or an 8-bit A/D converter of low cost and easy handling can be used as a control unit, thus reducing manufacturing cost.

Since the resistor material of the potentiometer is divided into several portions, even if the dynamic range is large, a highly accurate measurement becomes possible and effective.

While the invention has been described in its preferred embodiments, it is to be understood that the words which have been used are words of description rather than limitation and that various changes and modifications may be made within the purview of the appended claims without departing from the scope and spirit of the invention in its broader aspects.

What is claimed is:

1. Air flow measuring apparatus, comprising:
   a resistor portion connecting serially at least two resistors;
   a voltage circuit for supplying a voltage of predetermined magnitude and polarity to said resistors;
   an insulated movable member, which is rotated about a pivot depending on air flow, having a plurality of contacts thereon for indicating the amount of said air flow by contacting one of said resistors depending upon the position of said movable member, such indications constituting voltage signals formed by said supplied voltage and the contacted resistor; and
   a switch portion, associated with said movable member, for generating digital signals from said supplied voltage, said digital signals being representative of said contacted resistor.

2. Air flow measuring apparatus as in claim 1, wherein:
   said generated digital signals are formed by the voltage between a terminal of a resistor contacted with said movable member and a corresponding surface of said switch portion.

3. Air flow measuring apparatus as in claim 2, wherein:
   said voltage circuit comprises a D.C. power source and a plurality of voltage regulating resistors.

4. Air flow measuring apparatus as in claim 2, wherein:
   said switch portion comprises a plurality of contact points on said movable member, wires for connecting to each respective contact point and a plurality of associated conductive said surfaces, said surfaces having predetermined shape.

5. Air flow measuring apparatus as in claim 2, wherein:
   said resistor portion is printed on an insulated base plate.

6. Air flow measuring apparatus as in claim 3, wherein:
   said resistor portion is printed on an insulated base plate.

7. Air flow measuring apparatus as in claim 4, wherein:
   said resistor portion and plurality of conductive surfaces are printed on an insulated base plate.

8. Air flow measuring apparatus as in claim 4, wherein:
   said plurality of conductive surfaces are adapted to cooperate with said contact points.

* * * * *